(12) United States Patent
Gill

(10) Patent No.: US 7,130,166 B2
(45) Date of Patent: Oct. 31, 2006

(54) CPP GMR WITH IMPROVED SYNTHETIC FREE LAYER

(75) Inventor: Hardayal Singh Gill, Palo Alto, CA (US)

(73) Assignee: Hitachi Global Storage Technologies Netherlands B.V. (NL)

( * ) Notice: Subject to any disclaimer, the term of this patent is extended or adjusted under 35 U.S.C. 154(b) by 594 days.

(21) Appl. No.: 10/614,073

(22) Filed: Jul. 2, 2003

(65) Prior Publication Data

US 2005/0002131 A1    Jan. 6, 2005

(51) Int. Cl.
*G11B 5/39* (2006.01)
(52) U.S. Cl. .............................. 360/324.12; 360/324.11
(58) Field of Classification Search ...................... None
See application file for complete search history.

(56) References Cited

U.S. PATENT DOCUMENTS

| | | | |
|---|---|---|---|
| 6,693,776 B1 * | 2/2004 | Gill | 360/324.12 |
| 6,700,757 B1 * | 3/2004 | Pinarbasi | 360/324.12 |
| 6,806,804 B1 * | 10/2004 | Saito et al. | 336/200 |
| 6,943,997 B1 * | 9/2005 | Gill | 360/324.12 |
| 7,023,670 B1 * | 4/2006 | Saito | 360/324.12 |
| 2002/0191348 A1 * | 12/2002 | Hasegawa et al. | 360/314 |
| 2003/0227724 A1 * | 12/2003 | Li et al. | 360/324.12 |
| 2004/0141260 A1 * | 7/2004 | Hasegawa et al. | 360/324.11 |
| 2004/0218311 A1 * | 11/2004 | Saito et al. | 360/314 |

* cited by examiner

*Primary Examiner*—Jefferson Evans
(74) *Attorney, Agent, or Firm*—Zilka-Kotab, PC

(57) ABSTRACT

A magnetic head having an antiparallel (AP) pinned layer structure with at least two pinned layers having magnetic moments that are self-pinned antiparallel to each other. A free layer structure is spaced apart from the AP pinned layer structure, and includes a first free layer having a magnetic moment, a second free layer having a magnetic moment pinned antiparallel to the magnetic moment of the first free layer, and a third free layer having a magnetic moment pinned antiparallel to the magnetic moment of the second free layer.

23 Claims, 8 Drawing Sheets

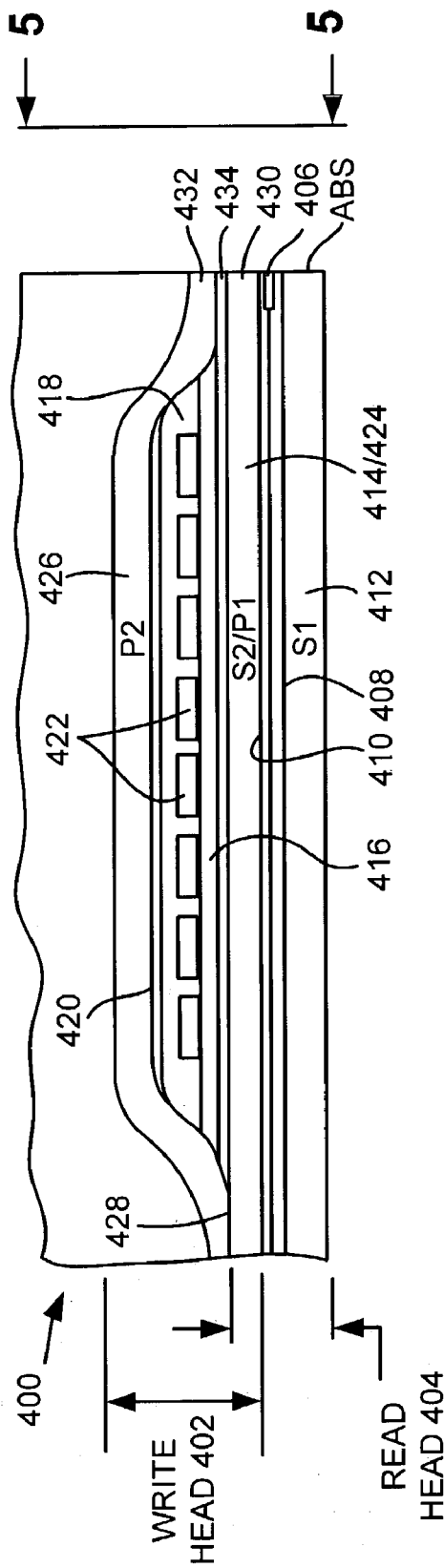
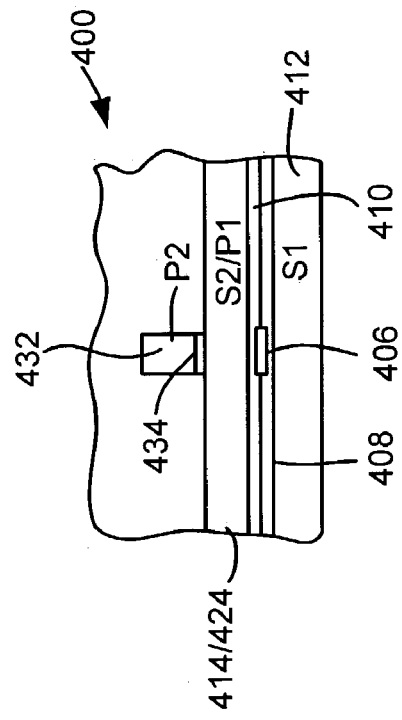
FIG. 4
FIG. 5

CPP GMR WITH IMPROVED SYNTHETIC FREE LAYER

FIELD OF THE INVENTION

The present invention relates to magnetic heads, and more particularly, this invention relates to read heads having a synthetic AP coupled free layer.

BACKGROUND OF THE INVENTION

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

In high capacity disk drives, magnetoresistive (MR) read sensors, commonly referred to as MR heads, are the prevailing read sensors because of their capability to read data from a surface of a disk at greater track and linear densities than thin film inductive heads. An MR sensor detects a magnetic field through the change in the resistance of its MR sensing layer (also referred to as an "MR element") as a function of the strength and direction of the magnetic flux being sensed by the MR layer.

The conventional MR sensor operates on the basis of the anisotropic magnetoresistive (AMR) effect in which an MR element resistance varies as the square of the cosine of the angle between the magnetization in the MR element and the direction of sense current flow through the MR element. Recorded data can be read from a magnetic medium because the external magnetic field from the recorded magnetic medium (the signal field) causes a change in the direction of magnetization of the MR element, which in turn causes a change in resistance of the MR element and a corresponding change in the sensed current or voltage.

Another type of MR sensor is the giant magnetoresistance (GMR) sensor manifesting the GMR effect. In GMR sensors, the resistance of the GMR sensor varies as a function of the spin-dependent transmission of the conduction electrons between ferromagnetic layers separated by a non-magnetic layer (spacer) and the accompanying spin-dependent scattering which takes place at the interface of the ferromagnetic and non-magnetic layers and within the ferromagnetic layers.

GMR sensors using only two layers of ferromagnetic material (e.g., Ni—Fe) separated by a layer of non-magnetic material (e.g., copper) are generally referred to as spin valve (SV) sensors. In an SV sensor, one of the ferromagnetic layers, referred to as the pinned layer (reference layer), has its magnetization typically pinned by exchange coupling with an antiferromagnetic (e.g., NiO or Fe—Mn) layer. The pinning field generated by the anti ferromagnetic layer should be greater than demagnetizing fields (about 200 Oe) at the operating temperature of the SV sensor (about 120° C.) to ensure that the magnetization direction of the pinned layer remains fixed during the application of external fields (e.g., fields from bits recorded on the disk). The magnetization of the other ferromagnetic layer, referred to as the free layer, however, is not fixed and is free to rotate in response to the field from the recorded magnetic medium (the signal field). U.S. Pat. No. 5,206,590 granted to Dieny et al., incorporated herein by reference, discloses a SV sensor operating on the basis of the GMR effect.

An exemplary high performance read head employs a spin valve sensor for sensing the magnetic signal fields from the rotating magnetic disk. FIG. 1A shows a prior art SV sensor 100 comprising a free layer (free ferromagnetic layer) 110 separated from a pinned layer (pinned ferromagnetic layer) 120 by a non-magnetic, electrically-conducting spacer layer 115. The magnetization of the pinned layer 120 is fixed by an antiferromagnetic (AFM) layer 130.

FIG. 1B shows another prior art SV sensor 150 with a flux keepered configuration. The SV sensor 150 is substantially identical to the SV sensor 100 shown in FIG. 1A except for the addition of a keeper layer 152 formed of ferromagnetic material separated from the free layer 110 by a non-magnetic spacer layer 154. The keeper layer 152 provides a flux closure path for the magnetic field from the pinned layer 120 resulting in reduced magnetostatic interaction of the pinned layer 120 with the free layer 110. U.S. Pat. No. 5,508,867 granted to Cain et al., incorporated herein by reference, discloses a SV sensor having a flux keepered configuration.

Another type of SV sensor is an antiparallel (AP)-pinned SV sensor. In AP-Pinned SV sensors, the pinned layer is a laminated structure of two ferromagnetic layers separated by a non-magnetic coupling layer such that the magnetizations of the two ferromagnetic layers are strongly coupled together antiferromagnetically in an antiparallel orientation. The AP-Pinned SV sensor provides improved exchange coupling of the antiferromagnetic (AFM) layer to the laminated pinned layer structure than is achieved with the pinned layer structure of the SV sensor of FIG. 1A. This improved exchange coupling increases the stability of the AP-Pinned SV sensor at high temperatures which allows the use of corrosion resistant antiferromagnetic materials such as NiO for the AFM layer.

Referring to FIG. 2A, an AP-Pinned SV sensor 200 comprises a free layer 210 separated from a laminated AP-pinned layer structure 220 by a nonmagnetic, electrically-conducting spacer layer 215. The magnetization of the laminated AP-pinned layer structure 220 is fixed by an AFM layer 230. The laminated AP-pinned layer structure 220 comprises a first ferromagnetic layer 226 and a second ferromagnetic layer 222 separated by an antiparallel coupling (APC) layer 224 of nonmagnetic material. The two ferromagnetic layers 226, 222 ($FM_1$ and $FM_2$) in the laminated AP-pinned layer structure 220 have their magnetization directions oriented antiparallel, as indicated by the arrows 227, 223 (arrows pointing out of and into the plane of the paper respectively).

A key requirement for optimal operation of an SV sensor is that the pinned layer should be magnetically saturated perpendicular to the air bearing surface. Lack of magnetic saturation in the pinned layer leads to reduced signal or dynamic range. Factors leading to a loss of saturation include demagnetizing fields at the edge of the pinned layer, magnetic fields from recorded data and from longitudinal biasing regions, current induced fields and the coupling field to the free layer.

Analysis of the magnetic state of pinned layers in small sensors (a few microns or less in width), reveals that due primarily to the presence of large demagnetizing fields at the sensor edges the magnetization is not uniform over the area of the pinned layer. FIG. 2B shows a perspective view of an SV sensor 250. The SV sensor 250 is formed of a sensor stripe 260 having a front edge 270 at the ABS and extending away from the ABS to a rear edge 272. Due to the large demagnetizing fields at the front edge 270 and the rear edge 272 of the sensor stripe 260, the desired perpendicular magnetization direction is achieved only at the center portion 280 of the pinned layer stripe, while the magnetization tends to be curled into a direction parallel to the ABS at the edges of the stripe. The extent of these curled regions is controlled by the magnetic stiffness of the pinned layer.

Furthermore, prior art AP-Pinned SV sensors use an AFM in order to pin the pinned layer magnetization. Most commonly used AFM materials have blocking temperatures (temperature at which the pinning field reaches zero Oe) near 200° C. This means that if the temperature of the SV sensor approaches this temperature, the pinned layer magnetization can change its orientation resulting in degraded SV sensor performance.

Although AP-Pinned SV sensors have large effective pinning fields because near cancellation of the magnetic moments of the two sub-layers results in a low net magnetic moment for the pinned layer, thermal stability is still a concern because the operating temperatures of these SV sensors in disk files can exceed 120° C. In addition, the AP-pinned layer structure is vulnerable to demagnetization during processing operations such as lapping.

Therefore there is a need for an SV sensor that increases the magnetic saturation of the pinned layer and reduces the sensitivity to demagnetizing fields particularly at the front and rear edges of the pinned layer stripe. In SV sensors that include AFM layers to provide exchange anisotropy fields to fix the pinned layer magnetization direction, there is a further need for an SV structure that reduces the temperature limitations imposed by the blocking temperature characteristics of the commonly used antiferromagnetic materials required in prior art SV sensors for providing pinning fields.

In any of the prior art sensors described above, the thickness of the spacer layer is chosen so that shunting of the sense current and a magnetic coupling between the free and pinned layer structures are minimized. This thickness is typically less than the mean free path of electrons conducted through the sensor. With this arrangement, a portion of the conduction electrons are scattered at the interfaces of the spacer layer with the pinned and free layer structures. When the magnetic moments of the pinned and free layer structures are parallel with respect to one another scattering is minimal and when their magnetic moments are antiparallel scattering is maximized. Changes in scattering changes the resistance of the spin valve sensor as a function of cos θ, where θ is the angle between the magnetic moments of the pinned and free layer structures. The sensitivity of the sensor is quantified as magnetoresistive coefficient dr/R where dr is the change in the resistance of the sensor as the magnetic moment of the free layer structure rotates from a position parallel with respect to the magnetic moment of the pinned layer structure to an antiparallel position with respect thereto and R is the resistance of the sensor when the magnetic moments are parallel.

The transfer curve of a spin valve sensor is defined by the aforementioned cos θ where θ is the angle between the directions of the magnetic moments of the free and pinned layers. In a spin valve sensor subjected to positive and negative magnetic signal fields from a moving magnetic disk, which are typically chosen to be equal in magnitude, it is desirable that positive and negative changes in the resistance of the spin valve read head above and below a bias point on the transfer curve of the sensor be equal so that the positive and negative readback signals are equal. When the direction of the magnetic moment of the free layer is substantially parallel to the ABS and the direction of the magnetic moment of the pinned layer is perpendicular to the ABS in a quiescent state (no signal from the magnetic disk) the positive and negative readback signals should be equal when sensing positive and negative fields from the magnetic disk.

Accordingly, the bias point should be located midway between the top and bottom of the transfer curve. When the bias point is located below the midway point the spin valve sensor is negatively biased and has positive asymmetry and when the bias point is above the midway point the spin valve sensor is positively biased and has negative asymmetry. When the readback signals are asymmetrical, signal output and dynamic range of the sensor are reduced. Readback asymmetry is defined as:

$$\frac{V_1 - V_2}{\max(V_1 \text{ or } V_2)}$$

For example, +10% readback asymmetry means that the positive readback signal $V_1$ is 10% greater than it should be to obtain readback symmetry. 10% readback asymmetry is acceptable in some applications. +10% readback asymmetry may not be acceptable in applications where the applied field magnetizes the free layer close to saturation. The designer strives to improve asymmetry of the readback signals as much as practical with the goal being symmetry.

The location of the transfer curve relative to the bias point is influenced by four major forces on the free layer of a spin valve sensor, namely a ferromagnetic coupling field $H_{FC}$ between the pinned layer and the free layer, a net demagnetizing (demag) field $H_D$ from the pinned layer, a sense current field $H_I$ from all conductive layers of the spin valve except the free layer, a net image current field $H_{IM}$ from the first and second shield layers.

Another factor that can affect readback asymmetry is positive magnetostriction of the free layer structure. If the free layer structure has positive magnetostriction and is subjected to compressive stress, there will be a stress-induced anisotropy that urges the magnetic moment of the free layer from the aforementioned position parallel to the ABS toward a position perpendicular to the ABS. The result is readback asymmetry. The compressive stress occurs after the magnetic head is lapped at the ABS to form the stripe height of the sensor of the read head. After lapping, the free layer is in compression and this, in combination With positive magnetostriction, causes the aforementioned readback asymmetry. It is interesting to note that if the free layer structure has negative magnetostriction in combination with compressive stress that the magnetic moment of the free layer is strengthened along the position parallel to the ABS. A high negative magnetostriction, however, is not desirable because it makes the magnetic moment of the free layer structure stiff and less responsive to field signals from the rotating magnetic disk. Accordingly, it is desirable that the magnetostriction of the free layer be zero or only slightly negative.

Unfortunately, magnetostriction of the free layer is difficult to control in present sputtering deposition systems. A typical free layer structure includes first and second free layers wherein the first free layer is cobalt iron and the second free layer is nickel iron with the first free layer interfacing the copper spacer layer for increasing the magnetoresistive coefficient dr/R of the sensor. Typical compositions of the free layers are cobalt iron ($Co_{90}Fe_{10}$) for the first free layer and nickel iron ($Ni_{83}Fe_{17}$) for the second free layer. When these layers are formed by sputter deposition the free layer structure invariably has an undesirable positive magnetostriction. In the past, the positive magnetostriction of the free layers has been accomplished by changing the composition of the free layers, such as reducing the iron content in the nickel iron and/or reducing the iron content in the cobalt iron. Since there is typically more than one nickel iron and cobalt iron layer in the spin valve sensor, this means that the targets in the sensor have to be changed in order to change the composition and lower the magnetostriction of the free layer structure.

What is needed is a magnetic head with improved dr/R and thermal stability.

SUMMARY OF THE INVENTION

The present invention overcomes the drawbacks and limitations described above by providing a magnetic head having an antiparallel (AP) pinned layer structure with at least two pinned layers having magnetic moments that are self-pinned antiparallel to each other. A free layer structure is spaced apart from the AP pinned layer structure, and includes a first free layer having a magnetic moment, a second free layer having a magnetic moment pinned antiparallel to the magnetic moment of the first free layer, and a third free layer having a magnetic moment pinned antiparallel to the magnetic moment of the second free layer.

In another embodiment, the head includes spaced apart upper and lower AP pinned layers each having a structure similar to the AP pinned layer structure described above. A free layer structure similar to the free layer described in the previous paragraph is positioned between the AP pinned layer structures.

For either of the previous embodiment, a net magnetic moment of the second and third free layers is preferably negligible, so that their effects on the sensing signal cancel each other out. A thickness of each of the free layers perpendicular to planes of the free layers is preferably less than about 100 Å. Also preferably, a thickness of the first free layer is greater than thicknesses of the second and third free layers, individually.

Preferably, the second free layer is constructed of a material having a lower electrical conductivity than the first and third free layers. For example, the second free layer can include at least NiFe and the first and third free layers can include at least CoFe.

A Cu spacer layer is preferably positioned between the AP pinned layer structure(s) and the free layer structure, as free layers at the free layer-Cu spacer layer(s) interface contribute more to the signal. A head as recited in claim 1, wherein the head forms part of a GMR head. Hard bias layers may be positioned along opposite track edges of the free layer structure.

The reading head described herein may for m part of a GMR head, a CPP GMR sensor, a CIP GMR sensor, a CPP tunnel valve sensor, etc. for use in a magnetic storage system.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 4 is a partial view of the slider and a merged magnetic head.

FIG. 5 is a partial ABS view, not to scale, of the slider taken along plane 5—5 of FIG. 4 to show the read and write elements of the merged magnetic head.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 1A:
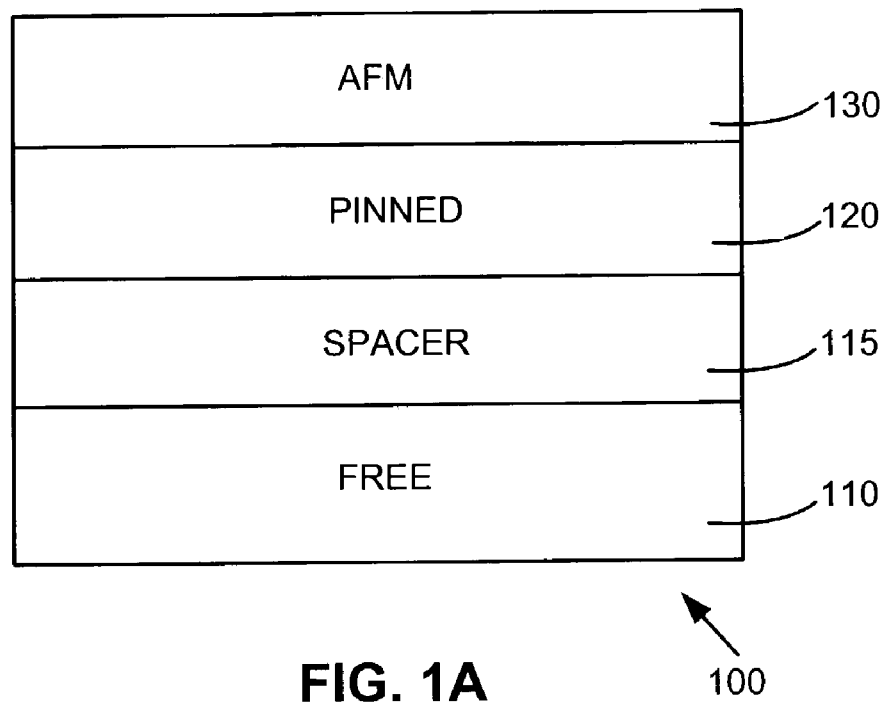
FIG. 1A is an air bearing surface view, not to scale, of a prior art spin valve (SV) sensor.
Figure 1B:
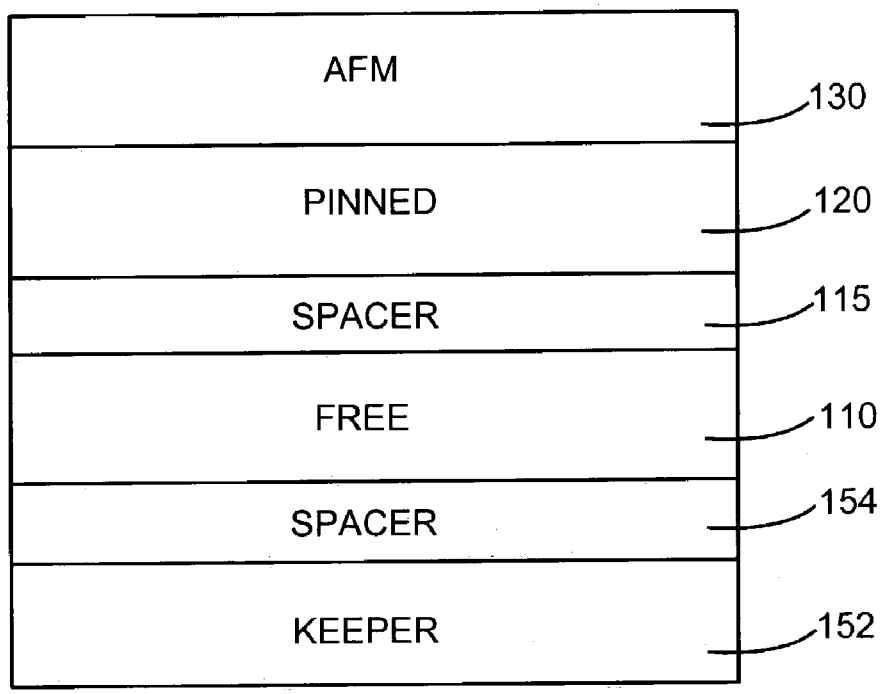
FIG. 1B is an air bearing surface view, not to scale, of a prior art keepered SV sensor.
Figure 2A:
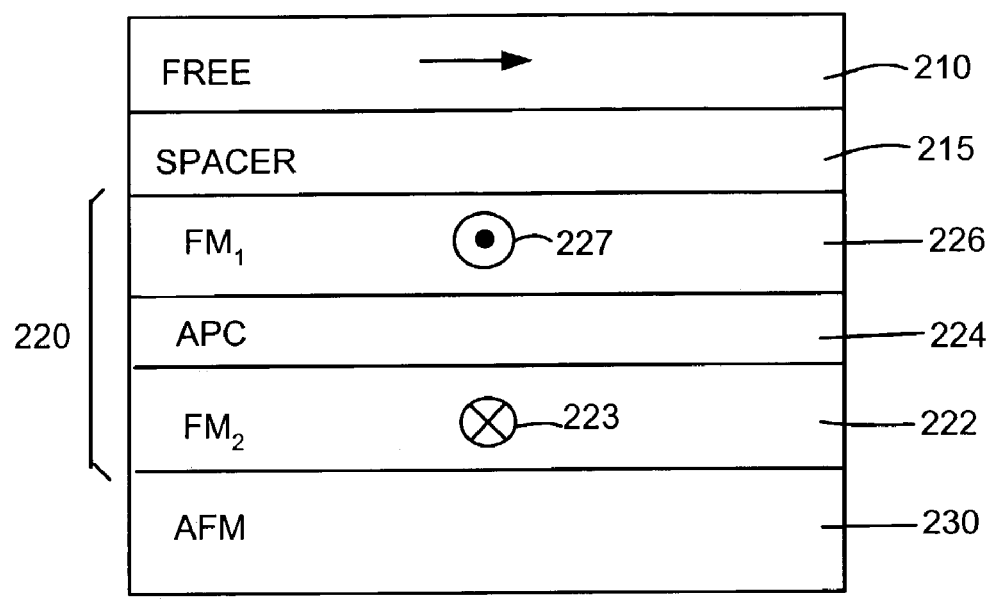
FIG. 2A is an air bearing surface view, not to scale, of a prior art AP-Pinned SV sensor.
Figure 2B:
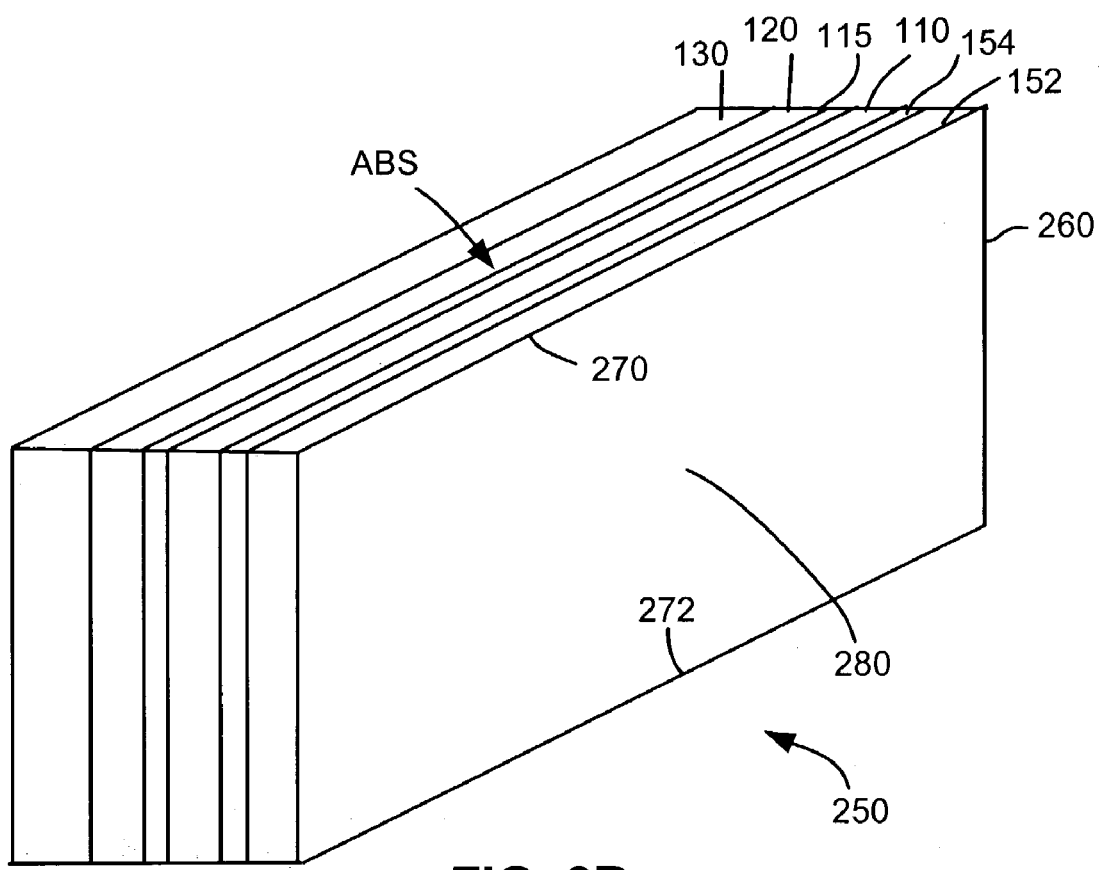
FIG. 2B is a perspective view, not to scale, of a prior art AP-Pinned SV sensor.
Figure 3:
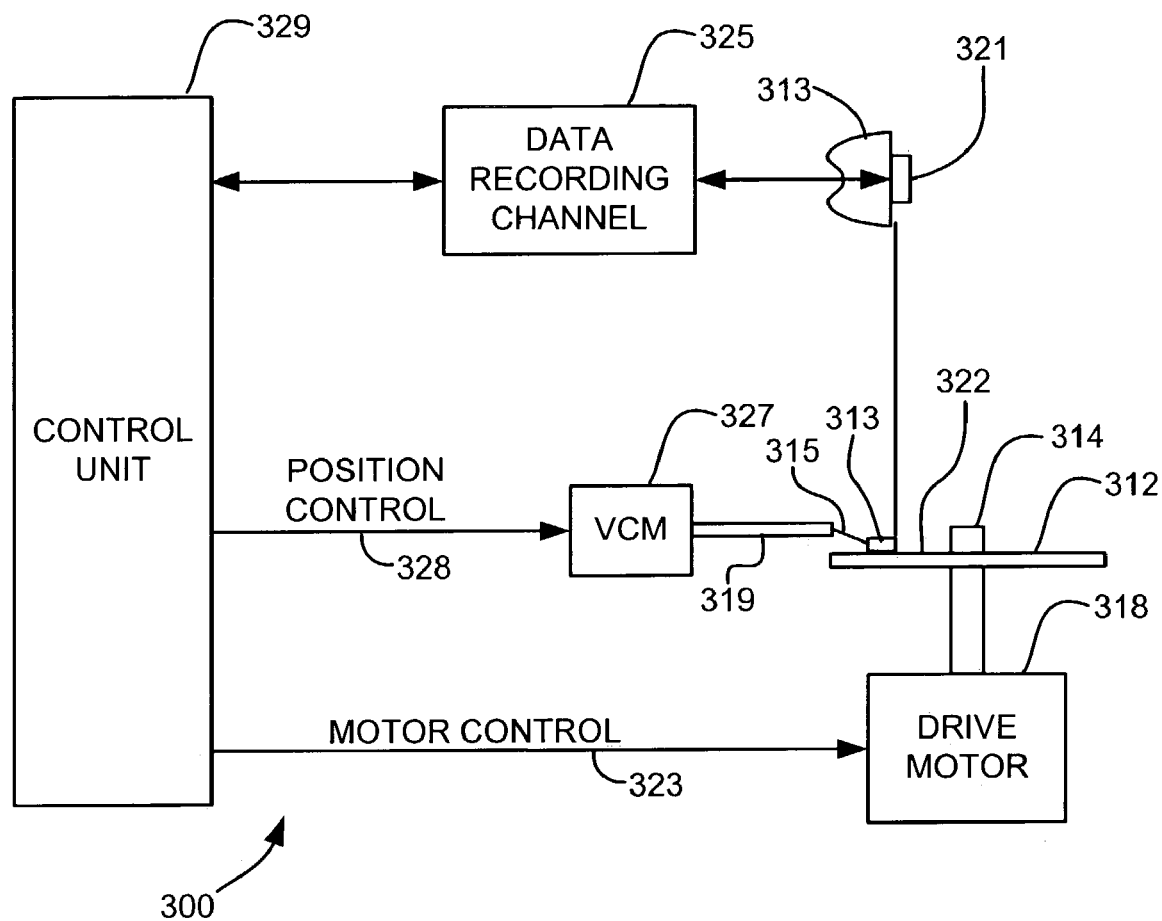
FIG. 3 is a simplified drawing of a magnetic recording disk drive system.

Referring now to FIG. 3, there is shown a disk drive 300 embodying the present invention. As shown in FIG. 3, at least-one rotatable magnetic disk 312 is supported on a spindle 314 and rotated by a disk drive motor 318. The magnetic recording on each disk is in the form of an annular pattern of concentric data tracks (not shown) on the disk 312.

At least one slider 313 is positioned near the disk 312, each slider 313 supporting one or more magnetic read/write heads 321. More information regarding such heads 321 will be set forth hereinafter during reference to FIG. 4. As the disks rotate, slider 313 is moved radially in and out over disk surface 322 so that heads 321 may access different tracks of the disk where desired data are recorded. Each slider 313 is attached to an actuator arm 319 by means way of a suspension 315. The suspension 315 provides a slight spring force which biases slider 313 against the disk surface 322. Each actuator arm 319 is attached to an actuator means 327. The actuator means 327 as shown in FIG. 3 may be a voice coil motor (VCM). The VCM comprises a coil movable within a fixed magnetic field, the direction and speed of the coil movements being controlled by the motor current signals supplied by controller 329.

During operation of the disk storage system, the rotation of disk 312 generates an air bearing between slider 313 and disk surface 322 which exerts an upward force or lift on the slider. The air bearing thus counter-balances the slight spring force of suspension 315 and supports slider 313 off and slightly above the disk surface by a small, substantially constant spacing during normal operation.

The various components of the disk storage system are controlled in operation by control signals generated by control unit 329, such as access control signals and internal clock signals. Typically, control unit 329 comprises logic control circuits, storage means and a microprocessor. The control unit 329 generates control signals to control various system operations such as drive motor control signals on line 323 and head position and seek control signals on line 328. The control signals on line 328 provide the desired current profiles to optimally move and position slider 313 to the desired data track on disk 312. Read and write signals are communicated to and from read/write heads 321 by way of recording channel 325.

The above description of a typical magnetic disk storage system, and the accompanying illustration of FIG. 3 are for representation purposes only. It should be apparent that disk storage systems may contain a large number of disks and actuators, and each actuator may support a number of sliders.

FIG. 4 is a side cross-sectional elevation view of a merged magnetic head 400, which includes a write head portion 402 and a read head portion 404, the read head portion employing a dual spin valve sensor 406 of the present invention. FIG. 5 is an ABS view of FIG. 4. The spin valve sensor 406 is sandwiched between nonmagnetic electrically insulative first and second read gap layers 408 and 410, and the read gap layers are sandwiched between ferromagnetic first and second shield layers 412 and 414. In response to external magnetic fields, the resistance of the spin valve sensor 406 changes. A sense current ($I_s$) conducted through the sensor causes these resistance changes to be manifested as potential changes. These potential changes are then processed as readback signals by the processing circuitry 329 shown in FIG. 3.

The write head portion 402 of the magnetic head 400 includes a coil layer 422 sandwiched between first and second insulation layers 416 and 418. A third insulation layer 420 may be employed for planarizing the head to eliminate ripples in the second insulation layer caused by the coil layer 422. The first, second and third insulation layers are referred to in the art as an "insulation stack". The coil layer 422 and the first, second and third insulation layers 416, 418 and 420 are sandwiched between first and second pole piece layers 424 and 426. The first and second pole piece layers 424 and 426 are magnetically coupled at a back gap 428 and have first and second pole tips 430 and 432 which are separated by a write gap layer 434 at the ABS. Since the second shield layer 414 and the first pole piece layer 424 are a common layer this head is known as a merged head. In a piggyback head an insulation layer is located between a second shield layer and a first pole piece layer. First and second solder connections (not shown) connect leads (not shown) from the spin valve sensor 406 to leads (not shown) on the slider 313 (FIG. 3), and third and fourth solder connections (not shown) connect leads (not shown) from the coil 422 to leads (not shown) on the suspension.

Figure 6:
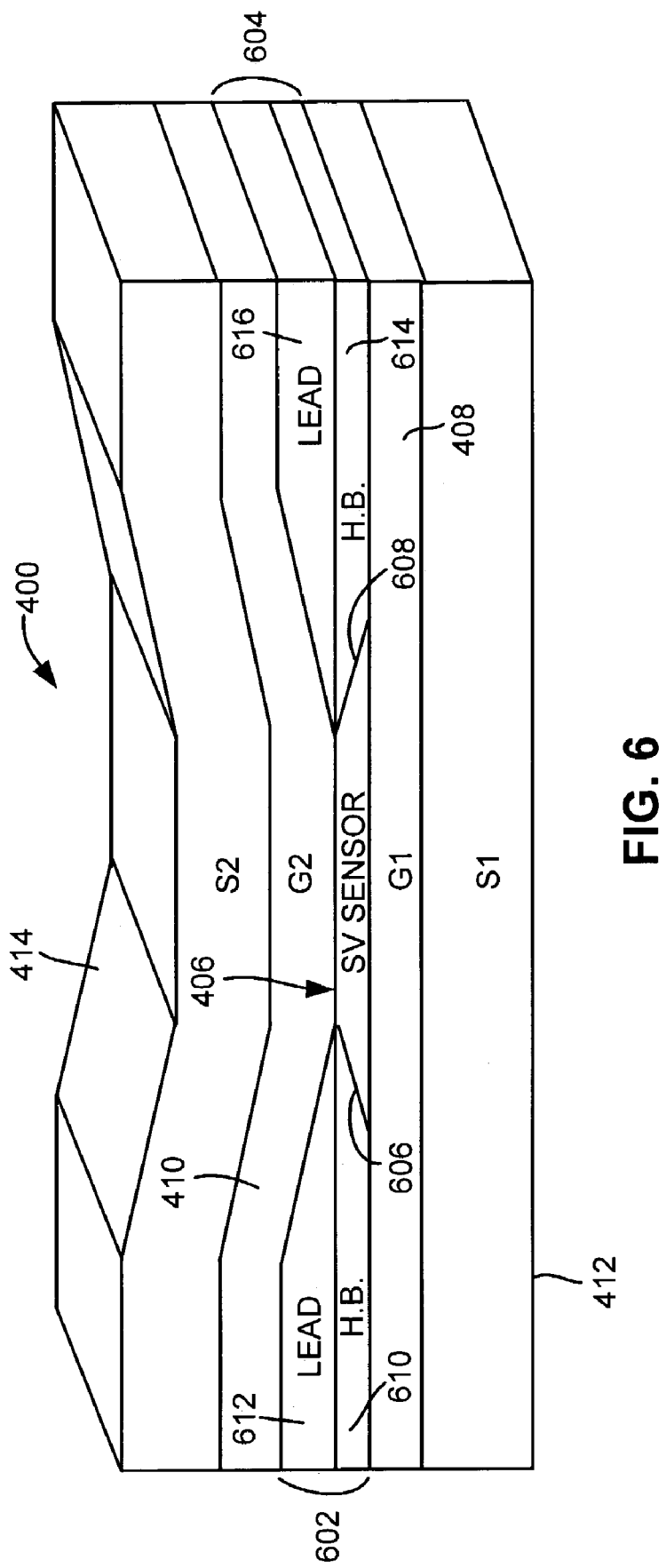
FIG. 6 is an enlarged isometric illustration, not to scale, of the read head with a spin valve sensor.

FIG. 6 is an enlarged isometric ABS illustration of the read head 400 shown in FIG. 4. The read head 400 includes the spin valve sensor 406. First and second hard bias and lead layers 602 and 604 are connected to first and second side edges 606 and 608 of the spin valve sensor. This connection is known in the art as a contiguous junction and is fully described in U.S. Pat. No. 5,018,037 which is incorporated by reference herein. The first hard bias and lead layers 602 include a first hard bias layer 610 and a first lead layer 612 and the second hard bias and lead layers 604 include a second hard bias layer 614 and a second lead layer 616. The hard bias layers 610 and 614 cause magnetic fields to extend longitudinally through the spin valve sensor 406 for stabilizing the magnetic domains therein. The spin valve sensor 406 and the first and second hard bias and lead layers 602 and 604 are located between the nonmagnetic electrically insulative first and second read gap layers 408 and 410. The first and second read gap layers 408 and 410 are, in turn, located between the ferromagnetic first and second shield layers 412 and 414.

The present invention provides a new sensor structure with improved dr/R and thermal stability. Many types of heads can use the structure described herein, and the structure is particularly adapted to a CPP GMR sensor. In the following description, the width of the layers (W) refers to the track width. The sensor height is in a direction into the face of the paper. Unless otherwise described, thicknesses of the individual layers are taken perpendicular to the plane of the associated layer and are provided by way of example only and may be larger and/or smaller than those listed. Similarly, the materials listed herein are provided by way of example only, and one skilled in the art will understand that other materials may be used without straying from the spirit and scope of the present invention.

Figure 7:
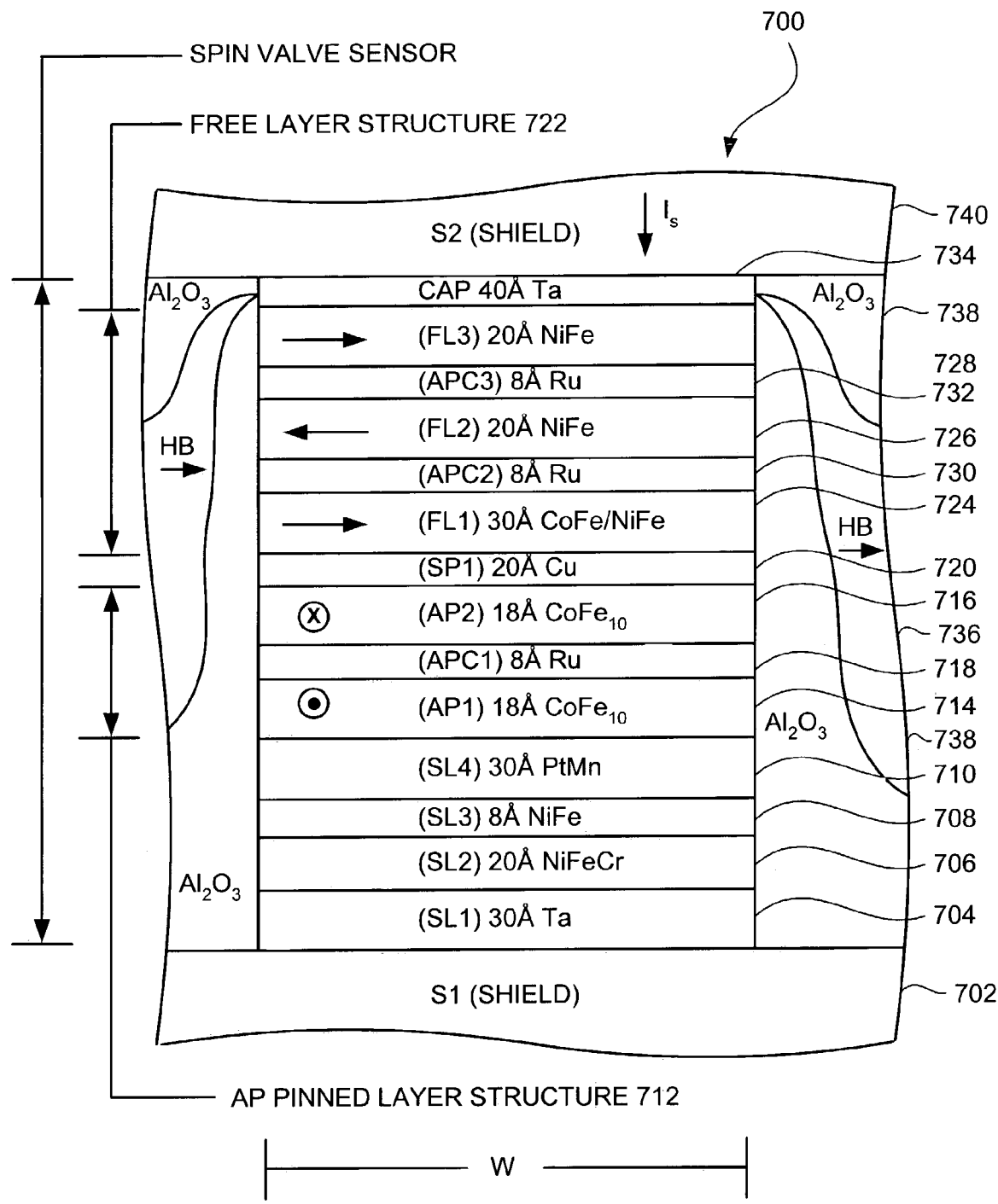
FIG. 7 is an ABS illustration of a CPP GMR sensor with a synthetic AP coupled free layer structure, not to scale, according to one embodiment of the present invention.

FIG. 7 depicts an ABS view of a CPP GMR sensor 700 according to one embodiment. "CPP" means that the sensing current ($I_s$) flows from one shield to the other shield in a direction perpendicular to the plane of the layers forming the sensor 700.

As shown in FIG. 7, a first shield layer (S1) 702 is formed on a substrate (not shown). The first shield layer 702 can be of any suitable material, such as permalloy (NiFe).

Seed layers are formed on the first shield layer 702. The seed layers aid in creating the proper growth structure of the layers above them. Illustrative materials formed in a stack from the first shield layer 702 are a layer of Ta (SL1) 704, a layer of NiFeCr (SL2) 706, a layer of NiFe (SL3) 708 and a layer of PtMn (SL4) 710. Illustrative thicknesses of these materials are Ta (30 Å), NiFeCr (20 Å), NiFe (8 Å), and PtMn (30 Å). Note that the stack of seed layers can be varied, and layers may be added or omitted based on the desired processing parameters.

Then an antiparallel (AP) pinned layer structure 712 is formed above the seed layers. As shown in FIG. 7, first and second AP pinned magnetic layers, (AP1) and (AP2) 714, 716, are separated by a thin layer of an antiparallel coupling material (APC1) 718 such that the magnetic moments of the AP pinned layers 714, 716 are self-pinned antiparallel to each other. The pinned layers 714, 716 have a property known as magnetostriction. The magnetostriction of the pinned layers 714, 716 is very positive. The sensor 700 is also under compressive stresses because of its geometry at the ABS, and the configuration of the layer is such that it produces very large compressive stress. The combination of high positive magnetostriction and compressive stress causes the pinned layers 714, 716 to develop a magnetic anisotropy that is in a perpendicular direction to the track width. This magnetic coupling through the Ru spacer causes the pinned layers 714, 716 to have antiparallel-oriented magnetizations.

In the embodiment shown in FIG. 7, the preferred magnetic orientation of the pinned layers 714, 716 is for the first pinned layer 714, into the face of the structure depicted (perpendicular to the ABS of the sensor 700), and out of the face for the second pinned layer 716. Illustrative materials for the pinned layers 714, 716 are $CoFe_{10}$ (90% Co, 10% Fe), $CoFe_{50}$ (50% Co, 50% Fe), etc. separated by a Ru layer 718. Illustrative thicknesses of the first and second pinned layers 714, 716 are between about 10 Å and 25 Å. The Ru layer 718 can be about 5–15 Å, but is preferably selected to provide a saturation fields above about 10 KOe. In a preferred embodiment, each of the pinned layers 714, 716 is about 18 Å with an Ru layer 718 therebetween of about 8 Å.

A first spacer layer (SP1) 720 is formed above the pinned layer structure 712. Illustrative materials for the first spacer layer 720 include Cu, $CuO_x$, $Cu/CoFeO_x/Cu$ stack, etc. The first spacer layer 720 can be about 10–30 Å thick, preferably about 20 Å.

A free layer structure (FL) 722 is formed above the first spacer layer 720. As shown, the free layer structure 722 has first, second, and third magnetic layers (FL1), (FL2), (FL3) 724, 726, 728, respectively, separated by second and third thin layers of antiparallel coupling material (APC2), (APC3) 730, 732, respectively. The antiparallel coupling layers 730, 732 cause the magnetic orientations of the layers 724, 726, 728 in the free layer structure 722 to be oriented antiparallel to each other. The resulting free layer structure 722 can be called a synthetic antiparallel coupled free layer structure. Preferred material for each of the first and third free layers 724, 726 is a CoFe/NiFe stack. The preferred material for the second free layer 728 is NiFe. Alternative materials for the free layers 724, 726, 728 in any combination include NiFe, CoFe, or a CoFe/NiFe stack. The thicknesses of the free layers 724, 726, 728 are preferably less than about 100 Å. A preferred material for the thin spacer layers is Ru of about 5–10 Å, preferably about 8 Å.

A cap (CAP) 734 is formed above the free layer structure 722. Exemplary materials for the cap 734 are Ta, Ta/Ru stack, etc. An illustrative thickness of the cap 734 is 20–30 Å.

On both sides of layer stack, i.e., along the track edges of the layer stack, hard bias layers (HB) 736 of conventional materials are sandwiched between an insulative material 738 such as alumina ($Al_2O_3$) or the like. The hard bias layers 736 have very high coercivity and are permanently magnetized with a magnetic orientation in the direction of the arrows shown. The field produced by the hard bias layers 736 stabilizes the fields of the layers 724, 726, 728 of the free layer structure 722.

A second shield layer (S2) 740 is formed above the cap 734.

The resulting structure 700 provides an improved free layer structure 722 with improved dr/R. Thermal stability is also increased due to the larger thickness of the free layer structure 722. Because the sensor 700 is a CPP GMR sensor, the sensing current flows through the sensor 700 in a direction perpendicular to the layers of the sensor 700. Each layer in the sensor 700 provides a certain amount of resistance to the sensing current. The resistance of the layers to the current passing therethrough is a function of the magnetic orientation of the layers in the free layer structure 722. As magnetic fields are applied to the sensor 700 by the media passing nearby, the resistance to the sensing current passing through the sensor 700 changes, thereby creating a varying signal representing data bits.

The multi-layer free layer structure 722 shown in FIG. 7 reduces detrimental effects on the sensing current passing through the sensor 700 caused by the second free layer of the free layer structure 722 as well as improve thermal stability.

To cancel the effect of the second free layer 726 on the sensing current, a third free layer 728 is added to the sensor 700. The third free layer 728 has a magnetic orientation antiparallel to the second free layer 726, which effectively reduces or cancels the electrically resistive effect of the second free layer 726 on the sensing current. Further, thermal stability is enhanced due to the larger thickness of the free layer without degradation to the signal (dr/R) since the second and third free layers 726, 728 cancel their contribution to dr/R. For example, assuming that the first free layer is the main free layer, to obtain an effective net magnetic thickness of 30 Å, the first free layer can be about 30 Å thick, and the second and third free layers 726, 728 can each be about 10 Å thick (30−10+10=30). Other combinations of thicknesses can also be used to achieve a similar result, such as 60/30/30 Å. Preferably, the third free layer 728 has about the same thickness as the second free layer 726 so that the net magnetic moment of the second and third free layers 726, 728 is negligible, e.g., about zero. Note, however, that the second and third free layers 726, 728 may be of other thicknesses.

Figure 8:
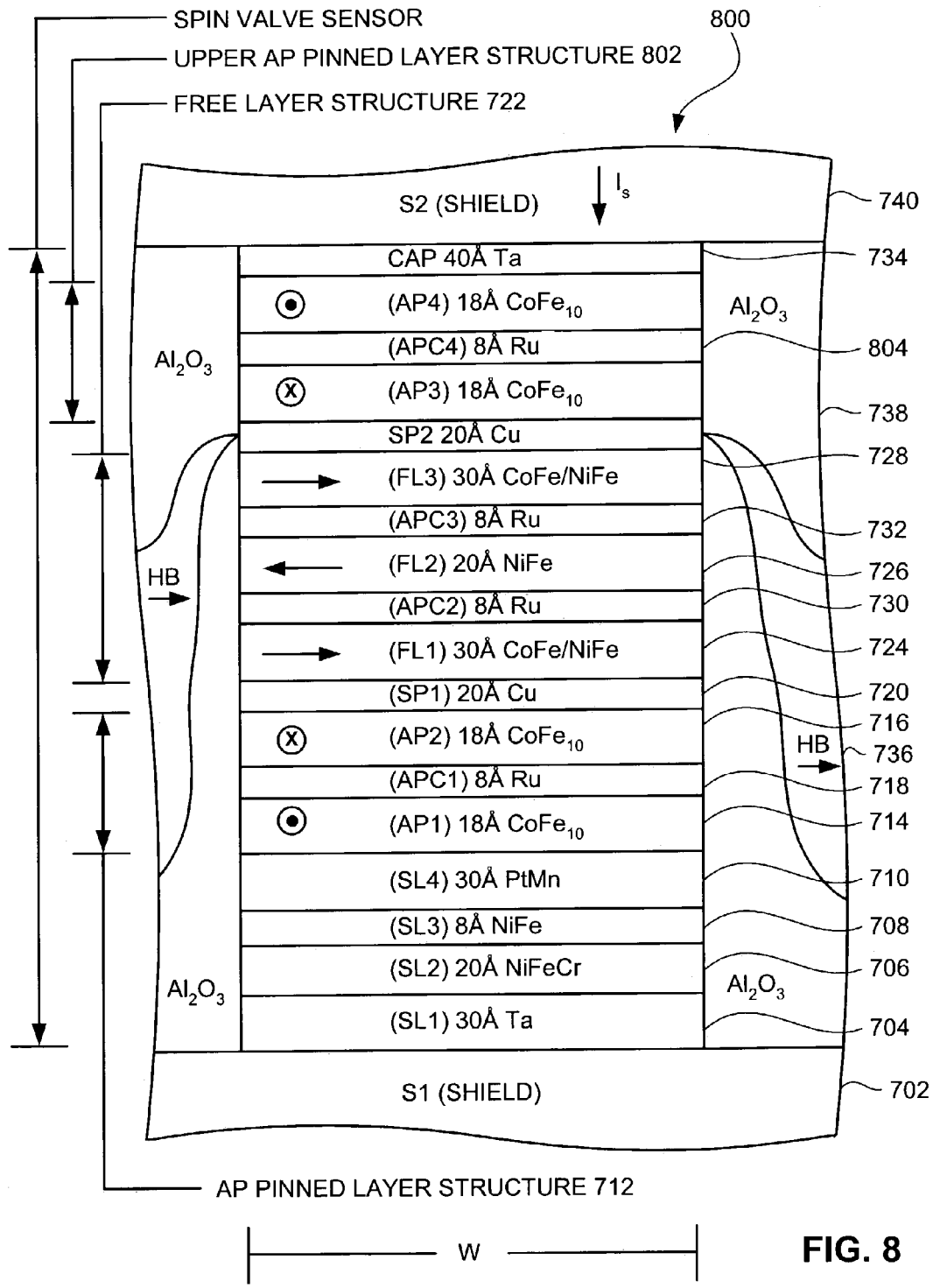
FIG. 8 is an ABS illustration of a dual CPP GMR with synthetic AP coupled free layer structure, not to scale, according to another embodiment of the present invention.

FIG. 8 depicts another sensor structure 800 that is similar to the structure 700 shown in FIG. 7, but has an upper pinned layer structure 802 positioned above the free layer structure 722 and separated from the free layer structure 722 by a second spacer layer (SP2) 804, preferably of materials similar to or the same as the first spacer layer 720. This configuration can be referred to as a dual CPP GMR with synthetic AP coupled free layer structure.

The free layer structure 722 again has three free layers 724, 726, 728 with magnetizations oriented antiparallel to each other. However, this sensor 800 provides more signal, as the first and third free layers 724, 728 can be set in phase and thus function in parallel to affect the sensing current. In other words, a dual-action sensing is occurring, with the first and third free layers 724, 728 both contributing to the signal.

Figure 9:
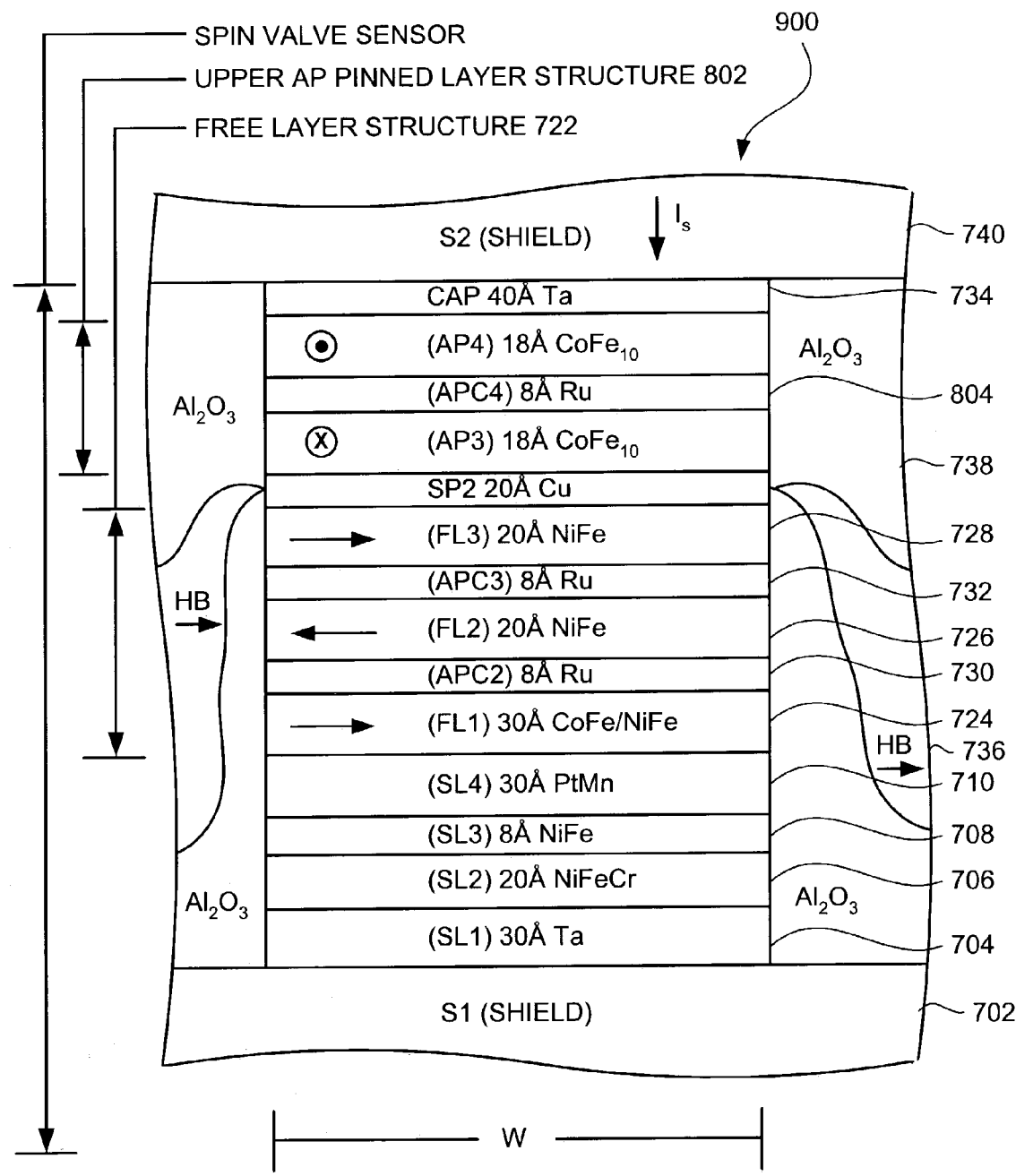
FIG. 9 is an ABS illustration of a CPP GMR sensor with a synthetic AP coupled free layer structure, not to scale, according to yet another embodiment of the present invention.

In a sensor of the type shown in FIG. 9, assuming that the first and third free layers 724, 728 are the main free layers, to get an effective net magnetic thickness of 30 Å, the first free layer 724 can be about 20 Å thick, the second free layer 726 can be about 10 Å thick and the third free layer 728 can be about 20 Å thick (20−10+20=30). Other combinations of thicknesses can also be used to achieve a similar result.

Also note that the magnetic alignments of the layers in the lower pinned layer structure 712 are oriented opposite the magnetic orientations of the layers in the upper pinned layer structure 802, i.e., the magnetic orientations of the layers of the upper and lower pinned layer structures 802, 712 that are positioned towards the free layer structure 722 are oriented in the same direction.

FIG. 9 depicts another embodiment of a CPP GMR sensor 900 with an upper pinned layer structure 802 positioned above the free layer structure 722 instead of below it.

In any of the sensors 700, 800, 900 described above, the second free layer 726 can be constructed of a material that does not contribute much to the signal, thereby increasing the sensitivity of the sensor even more. In a preferred embodiment, the first and third layers are constructed of CoFe while the second free layer is constructed of NiFe. CoFe gives more signal than NiFe.

Also note that where Cu is used to form the spacer layer, free layers at the free layer-Cu spacer layer(s) interface contribute more to the signal, and therefore the active free layer(s) should be positioned towards the Cu spacer(s).

While various embodiments have been described above, it should be understood that they have been presented by way of example only, and not limitation. For example, the structures and methodologies presented herein are generic in their application to all MR heads, AMR heads, GMR heads, spin valve heads, etc. Thus, the breadth and scope of a preferred embodiment should not be limited by any of the above-described exemplary embodiments, but should be defined only in accordance with the following claims and their equivalents.

What is claimed is:

1. A magnetic head comprising:
   an antiparallel (AP) pinned layer structure having at least two pinned layers having magnetic moments that are self-pinned antiparallel to each other; and
   a free layer structure spaced apart from the AP pinned layer structure, the free layer structure comprising:
      a first free layer having a magnetic moment;
      a second free layer having a magnetic moment pinned antiparallel to the magnetic moment of the first free layer; and
      a third free layer having a magnetic moment pinned antiparallel to the magnetic moment of the second free layer,
      wherein a net magnetic moment of the second and third free layers is negligible.

2. A head as recited in claim 1, further comprising a second antiparallel pinned layer structure spaced apart from the AP pinned layer structure, the second AP pinned layer structure having at least two pinned layers having magnetic moments that are self-pinned antiparallel to each other.

3. A head as recited in claim 1, wherein a thickness of each of the free layers perpendicular to planes of the free layers is less than about 100 Å.

4. A head as recited in claim 1, wherein a thickness of the first free layer is greater than thicknesses of the second and third free layers, individually, the thicknesses being measured in a direction perpendicular to a plane of the first free layer.

5. A head as recited in claim 1, further comprising hard bias layers positioned towards opposite track edges of the free layer structure.

6. A head as recited in claim 1, wherein the second free layer is constructed of a material having a lower electrical conductivity than the first and third free layers.

7. A head as recited in claim 6, wherein second free layer includes at least NiFe, wherein the first and third free layers include at least CoFe.

8. A head as recited in claim 1, further comprising a Cu spacer layer positioned between the AP pinned layer structure and the free layer structure.

9. A head as recited in claim 1, wherein the head forms part of a GMR head.

10. A head as recited in claim 1, wherein the head forms part of a CPP GMR sensor.

11. A magnetic storage system, comprising:
    magnetic media;
    at least one head for reading from and writing to the media, each head having:
       a sensor having the structure recited in claim 1;
       a write element coupled to the sensor;
    a slider for supporting the head; and
    a control unit coupled to the head for controlling operation of the head.

12. A magnetic head, comprising:
    an antiparallel (AP) pinned layer structure having at least two pinned layers having magnetic moments that are self-pinned antiparallel to each other; and
    a free layer structure positioned between the AP pinned layer structures, the free layer structure comprising:
       a first free layer having a magnetic moment;
       a second free layer having a magnetic moment pinned antiparallel to the magnetic moment of the first free layer; and
       a third free layer having a magnetic moment pinned antiparallel to the magnetic moment of the second free layer,
       wherein the second free layer is constructed of a material having a lower electrical conductivity than the first and third free layers.

13. A head as recited in claim 12, wherein a net magnetic moment of the second and third free layers is negligible.

14. A head as recited in claim 12, wherein a thickness of each of the free layers perpendicular to planes of the free layers is less than about 100 Å.

15. A head as recited in claim 12, wherein a thickness of the first free layer is greater than thicknesses of the second and third free layers, individually, the thicknesses being measured in a direction perpendicular to a plane of the first free layer.

16. A head as recited in claim 12, further comprising hard bias layers positioned towards opposite track edges of the free layer structure.

17. A head as recited in claim 12, further comprising a second antiparallel pinned layer structure spaced apart from the AP pinned layer structure, the second AP pinned layer structure having at least two pinned layers having magnetic moments that are self-pinned antiparallel to each other.

18. A head as recited in claim 12, wherein the second free layer includes at least NiFe, wherein the first and third free layers include at least CoFe.

19. A head as recited in claim 12, further comprising Cu spacer layers positioned between the AP pinned layer structures and the free layer structure.

20. A head as recited in claim 12, wherein the head forms part of a GMR head.

21. A head as recited in claim 12, wherein the head forms part of a CPP GMR sensor.

22. A magnetic storage system, comprising:
    magnetic media;
    at least one head for reading from and writing to the magnetic media, each head having:
       a sensor having the structure recited in claim 12;
       a write element coupled to the sensor;
    a slider for supporting the head; and
    a control unit coupled to the head for controlling operation of the head.

23. A magnetic head, comprising:
    an antiparallel (AP) pinned layer structure having at least two pinned layers having magnetic moments that are self-pinned antiparallel to each other; and
    a free layer structure spaced apart from the AP pinned layer structure, the free layer structure comprising:
       a first free layer having a magnetic moment;
       a second free layer having a magnetic moment pinned antiparallel to the magnetic moment of the first free layer; and
       a third free layer having a magnetic moment pinned antiparallel to the magnetic moment of the second free layer,
       wherein a thickness of the first free layer is greater than thicknesses of the second and third free layers, individually, the thicknesses being measured in a direction perpendicular to a plane of the first free layer.

* * * * *